(12) United States Patent
Yang et al.

(10) Patent No.: US 10,148,079 B2
(45) Date of Patent: Dec. 4, 2018

(54) SURGE PROTECTION DEVICE

(71) Applicant: Dongguan Littelfuse Electronics Co., Ltd., Dongguan, Guangdong (CN)

(72) Inventors: Wen Yang, Guangdong (CN); Hailang Tang, Guangdong (CN); Yanjing Xiao, Guangdong (CN)

(73) Assignee: Dongguan Littelfuse Electronics Co., Ltd., Dongguan, Guangdong (CN)

( * ) Notice: Subject to any disclaimer, the term of this patent is extended or adjusted under 35 U.S.C. 154(b) by 0 days.

(21) Appl. No.: 15/558,032

(22) PCT Filed: Apr. 7, 2015

(86) PCT No.: PCT/CN2015/075957
§ 371 (c)(1),
(2) Date: Sep. 13, 2017

(87) PCT Pub. No.: WO2016/161546
PCT Pub. Date: Oct. 13, 2016

(65) Prior Publication Data
US 2018/0062374 A1    Mar. 1, 2018

(51) Int. Cl.
| H01C 7/10 | (2006.01) |
| H02H 3/02 | (2006.01) |
| H01C 1/08 | (2006.01) |
| H01C 1/14 | (2006.01) |
| H01C 7/12 | (2006.01) |

(52) U.S. Cl.
CPC .............. *H02H 3/025* (2013.01); *H01C 1/08* (2013.01); *H01C 1/14* (2013.01); *H01C 7/12* (2013.01)

(58) Field of Classification Search
CPC ... H01C 1/18; H01C 1/14; H01C 7/12; H01H 61/02; H01H 37/761
USPC ..................................................... 338/21, 13
See application file for complete search history.

(56) References Cited

U.S. PATENT DOCUMENTS

| 3,863,111 | A | | 1/1975 | Martzloff |
| 4,975,674 | A | * | 12/1990 | Sumiyoshi ............. H01C 1/144 338/21 |
| 5,905,622 | A | | 5/1999 | Finlay, Sr. et al. |
| 5,933,310 | A | | 8/1999 | Eggendorfer |
| 6,430,019 | B1 | | 8/2002 | Martenson et al. |
| 6,535,369 | B1 | | 3/2003 | Redding |
| 6,683,770 | B1 | | 1/2004 | Marsh |
| 6,778,375 | B1 | | 8/2004 | Hoopes |

(Continued)

FOREIGN PATENT DOCUMENTS

| CN | 2559122 | 7/2003 |
| CN | 1684331 | 10/2005 |

(Continued)

OTHER PUBLICATIONS

Lee, KR 1020100073222, Jul. 2010, machine translation.*
Wu, CN201294330, Aug. 2009, machine translation.*

*Primary Examiner* — Kyung Lee

(57) ABSTRACT

A circuit protection device includes a metal oxide varistor (MOV), a spring terminal and a thermal disconnect coupling the spring terminal to the MOV. A gas discharge tube (GDT) is coupled to the MOV. The spring terminal is biased such that upon occurrence of an overvoltage condition, heat generated by the MOV melts the thermal disconnect and allows the spring terminal to be displaced away from the MOV, thereby creating an opening circuit.

13 Claims, 12 Drawing Sheets

(56) References Cited

U.S. PATENT DOCUMENTS

| | | | |
|---|---|---|---|
| 7,477,503 B2* | 1/2009 | Aszmus | H01C 7/126 361/103 |
| 7,483,252 B2* | 1/2009 | de Palma | H01C 7/112 361/127 |
| 7,933,108 B2 | 4/2011 | Tallam | |
| 8,031,456 B2* | 10/2011 | Wang | H01T 1/14 361/117 |
| 8,378,778 B2* | 2/2013 | Duval | H01C 7/126 338/13 |
| 9,147,510 B2* | 9/2015 | Depping | H01C 7/126 |
| 9,172,236 B2* | 10/2015 | Hirschmann | H01C 7/12 |
| 9,570,260 B2* | 2/2017 | Yang | H01H 37/761 |
| 2001/0015687 A1 | 8/2001 | McLoughlin | |
| 2002/0149899 A1 | 10/2002 | Kladar et al. | |
| 2006/0139832 A1 | 6/2006 | Yates et al. | |
| 2007/0128822 A1 | 6/2007 | McLoughlin et al. | |
| 2007/0217111 A1 | 9/2007 | Tseng | |
| 2007/0285865 A1 | 12/2007 | McLoughlin et al. | |
| 2008/0304200 A1 | 12/2008 | Hotchkiss et al. | |
| 2009/0323244 A1 | 12/2009 | Hoopes | |
| 2012/0050936 A1 | 3/2012 | Douglass et al. | |
| 2012/0068806 A1* | 3/2012 | Guarniere | H01C 7/10 337/1 |
| 2013/0322017 A1 | 12/2013 | Muller et al. | |
| 2014/0092514 A1 | 4/2014 | Chen | |
| 2014/0232512 A1 | 8/2014 | Yang et al. | |
| 2014/0292472 A1 | 10/2014 | Qin | |

FOREIGN PATENT DOCUMENTS

| | | |
|---|---|---|
| CN | 201294330 Y | 8/2009 |
| CN | 202260382 | 5/2012 |
| CN | 102739027 A | 10/2012 |
| JP | 2007202392 A | 8/2007 |
| JP | 3149085 U | 3/2009 |
| JP | 3155941 U | 12/2009 |
| KR | 20100073222 A | 7/2010 |
| TW | 200820298 A | 5/2008 |
| TW | 201230115 | 7/2012 |

* cited by examiner

SURGE PROTECTION DEVICE

FIELD OF THE DISCLOSURE

The present disclosure relates to the field of circuit protection devices. More particularly, the present disclosure relates to a surge protection device including a metal oxide varistor.

BACKGROUND OF THE DISCLOSURE

Overvoltage protection devices can be used to protect electronic circuits and components from damage due to overvoltage fault conditions. These overvoltage protection devices may include metal oxide varistors (MOVs) that can be connected between the circuits to be protected and a ground line. MOVs have current-voltage characteristics that allow them to be used to protect such circuits against catastrophic voltage surges. These devices may utilize a thermal link that melts during an overvoltage condition to contribute to the formation of an open circuit. In particular, when a voltage is applied to an MOV that is larger than the nominal or threshold voltage of the MOV, then a current can flow through the MOV that generates heat that can cause the thermal link to melt. Once the link melts, an open circuit can be created which prevents the overvoltage condition from damaging the circuit to be protected.

These conventional circuit protection devices, however, do not provide an efficient heat transfer from the MOV to the thermal link, thereby delaying response times. In addition, MOV devices have relatively high inductance characteristics, which may degrade performance in the presence of fast overvoltage transients. Moreover, conventional circuit protection devices are often complicated to assemble and require too many components to be used effectively in certain applications such as in Light Emitting Diode (LED) protection. Accordingly, it will be appreciated that improvements are desirable over conventional circuit protection devices employing metal oxide varistors.

SUMMARY

Circuit protection devices as described herein can provide surge protection across a load line and a neutral line, across the neutral line and a ground, and across the load line and the ground with a reduced number of circuit components, thereby reducing complexity and costs. The circuit protection device can include a metal oxide varistor (MOV) stack coupled to a spring by a solder connection to form a thermal disconnect. Upon the occurrence of an overvoltage or overcurrent condition, the thermal disconnect can be broken or melted, thereby separating the spring from a terminal of the MOV stack. The spring can be biased away from the terminal of the MOV stack such that, when the thermal disconnect is broken or melted, an open circuit condition results.

Circuit protection devices as described herein can include a high surge thermal disconnect device coupled to an MOV. The thermal disconnect device can include a first terminal soldered to a second spring terminal within a housing. The first terminal can form a portion of the thermal disconnect device and can be positioned in close proximity to a surface of the MOV. As an example, the first terminal can be coupled to or directly positioned over a top surface of the MOV. Upon the occurrence of an overvoltage or overcurrent condition, heat from the surface of the MOV can heat the first terminal and, in turn, can melt the solder connection between the first terminal and the spring terminal. The spring terminal can be biased away from the first terminal such that, when the solder connection is broken or melted, an open circuit condition results.

In various embodiments, the circuit protection device includes a metal oxide varistor (MOV) stack. A spring can be coupled to the MOV stack forming a thermal disconnect to form a fuse. A gas discharge tube (GDT) can be coupled to the MOV stack. The spring can be biased such that upon occurrence of an overvoltage condition, heat generated by the MOV stack melts the solder connection to allow the spring terminal to be displaced away from the MOV stack, thereby creating an open circuit.

In various embodiments, the circuit protection device can include a thermal disconnect device having a spring and a housing. The spring can have a first terminal coupled to a second terminal forming a fuse and at least a portion of the first terminal and the second terminal can be secured to the housing. A metal oxide varistor (MOV) is thermally coupled to the thermal disconnect device. A portion of the first terminal can electrically contact the MOV. A gas discharge tube (GDT) can be coupled to the MOV. Upon occurrence of an overvoltage condition, heat generated by the MOV melts the fuse of the thermal disconnect allowing the first terminal of the spring to be displaced away from the second terminal thereby forming an opening circuit.

Various embodiments are also directed to a method of manufacturing a circuit protection device. In an exemplary embodiment, the method of manufacturing comprises providing an MOV and a spring terminal coupled to the MOV. The method of manufacturing provides the spring terminal coupled to a first input of the circuit protection device. An inductor is coupled to the MOV and TVS diode is coupled to the inductor. The TVS diode can be coupled to the MOV and coupled to a second input of the circuit protection device. The method of manufacturing provides a GDT coupled between the MOV and a third input line of the circuit protection device. The spring terminal is biased such that upon occurrence of an overvoltage condition, heat generated by the MOV melts a thermal disconnect to open the fuse by disconnecting the spring terminal from the MOV, thereby creating an open circuit.

DETAILED DESCRIPTION

Figure 1A:
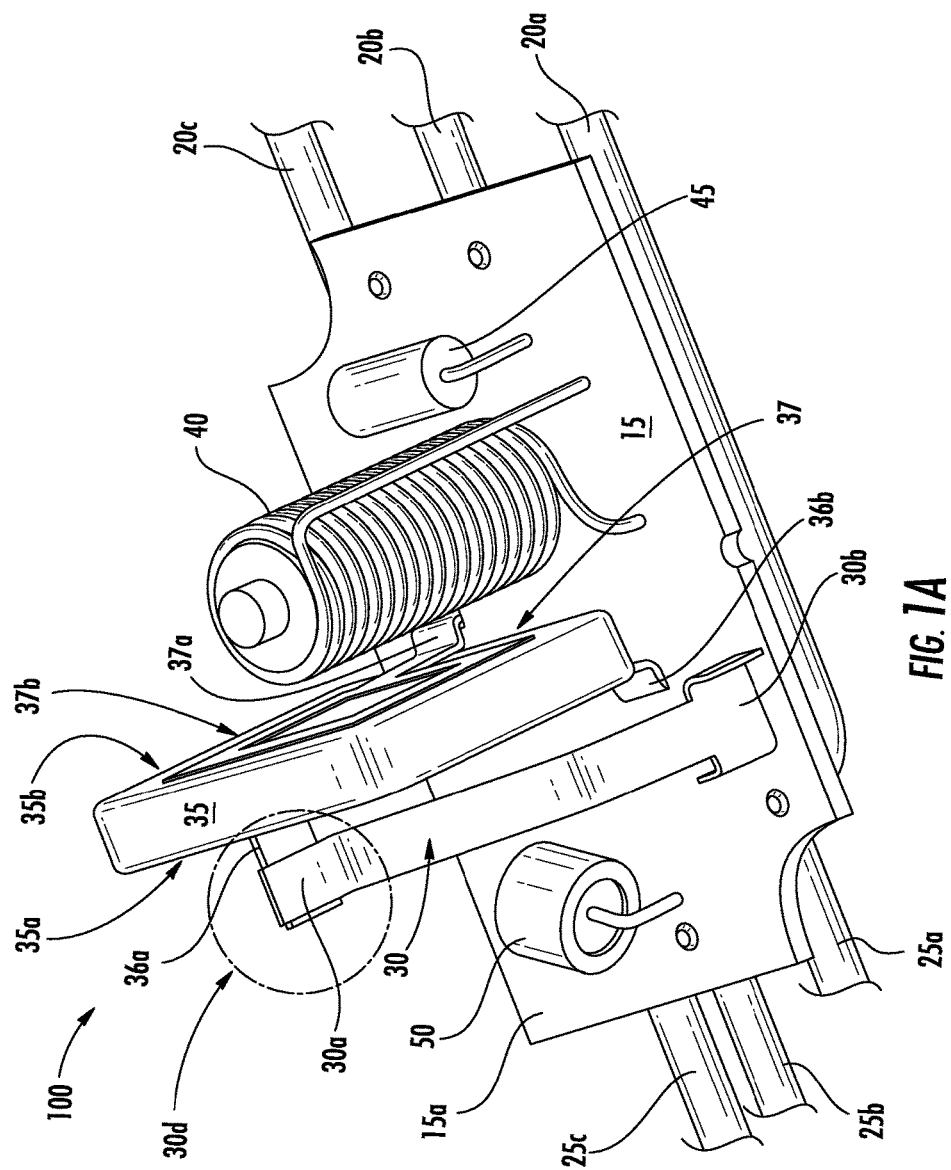
FIG. 1A is a perspective view of various components of a circuit protection device in accordance with an embodiment of the present disclosure.

The present disclosure will now be described more fully hereinafter with reference to the accompanying drawings, in which certain embodiments are shown. The present disclosure, however, may be embodied in many different forms and should not be construed as limited to the certain embodiments set forth herein. Rather, these embodiments are provided so that this disclosure will be thorough and complete to those skilled in the art. In the drawings, like numbers refer to like elements throughout.

FIG. 1A is a perspective view of various components of a circuit protection device 100 under normal operating conditions (i.e., where an overvoltage condition does not exist). The circuit protection device 100 includes three input lines 20a, 20b, and 20c and three output lines, 25a, 25b, and 25c. The input line 20a may be a load line connected to a conductive spring terminal 30 at an end 30b having one of a variety of configurations, such as a t-shape. The end 30b of conductive spring terminal 30 may be connected to the input line 20a via welding or other electrically conductive connection method. The conductive spring terminal 30 is mounted to a bottom portion 15a of housing 15 (shown in FIG. 2) at end 30b.

The conductive spring terminal 30 extends upwardly from bottom portion 15a of housing 15 and is connected to a first terminal 36 (shown in FIG. 1B) of Metal Oxide Varistor (MOV) 35 via a conductive protrusion 36a. In particular, the first terminal 36 of MOV 35 comprises conductive protrusion 36a, end 36b, and a conductive plate 36c disposed on surface 35a of MOV 35 (more clearly shown in FIG. 1B). The conductive plate 36c is in contact with surface 35a of MOV 35 sufficiently to conduct heat generated by MOV 35 during an overvoltage condition. The conductive protrusion 36a may be planar and extends away from surface 35a of MOV 35 and is electrically connected to end 30a of conductive spring terminal 30 via solder as described in more detail below.

Figure 1B:
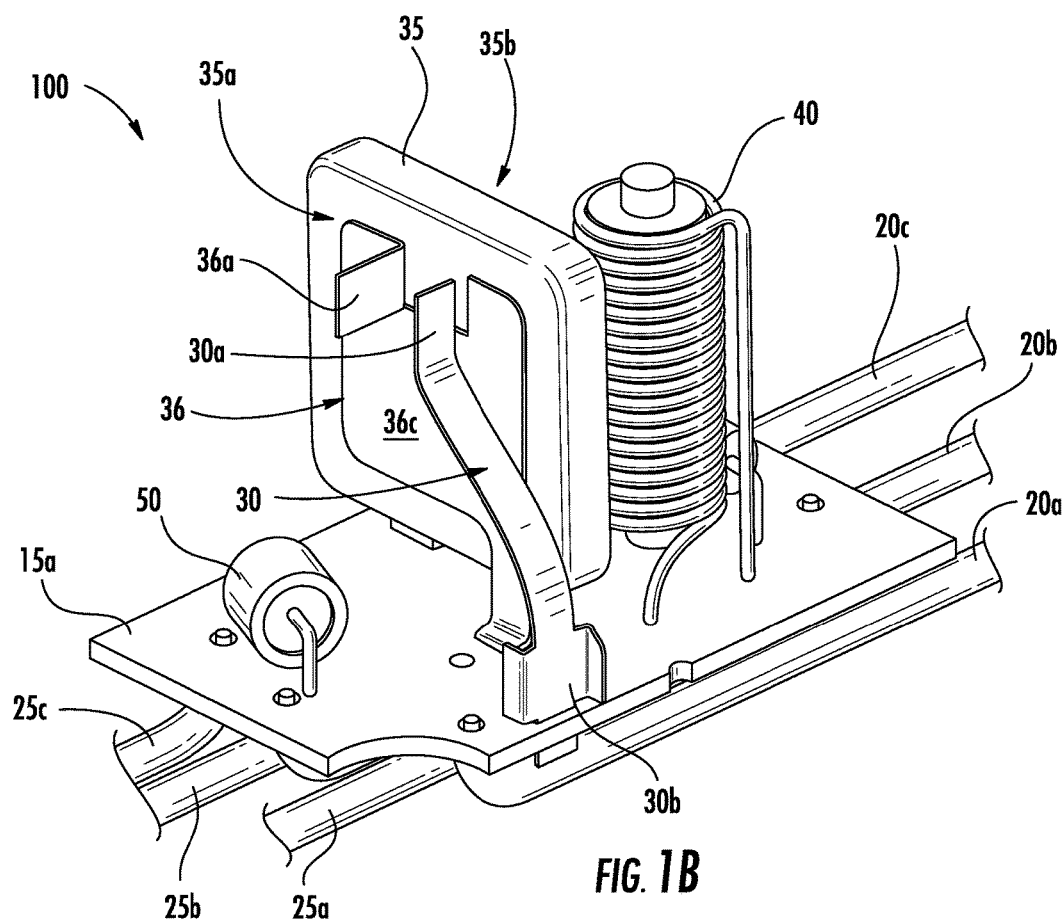
FIG. 1B is a second perspective view of the various components of the circuit protection device of FIG. 1A.

A second terminal 37 of MOV 35 is defined by a first end 37a and a plate 37b disposed on surface 35b of MOV 35 similar to conductive plate 36c of first terminal 36 shown in FIG. 1B. The plate 37b may have a shape corresponding to the shape of MOV 35, may be a conductive trace having a square shape or any other shape associated with the surface 35b of MOV 35. The MOV 35 may be an MOV stack having a plurality of MOVs depending on the rating of the circuit protection device 100. End 30a of the conductive spring terminal 30 may also be planar and is coupled or connected to the conductive protrusion 36a of first terminal 36 via soldering, for example using a low temperature solder creating a thermal disconnect 30d.

The thermal disconnect 30d provides for a quick response to an overheating condition generated by the MOV 35 in an abnormal overvoltage condition. In particular, the MOV 35 generates heat during an overvoltage condition which is conducted through conductive plate 36c to conductive protrusion 36a of first terminal 36. Once the low temperature solder (not shown) electrically connecting the conductive protrusion 36a and end 30a is melted or "broken" from the heat generated by MOV 35, end 30a of the conductive spring terminal 30 becomes disconnected (e.g., decoupled) from the conductive protrusion 36a since conductive spring terminal 30 is biased away from conductive protrusion 36a. It should be noted that when the conductive spring terminal 30 is disconnected from the MOV 35, the disconnection may be considered as "decoupled." Thus, an open circuit is formed as end 30a of the conductive spring terminal 30 is no longer electrically coupled to MOV 35. The conductive protrusion 36a of the first terminal 36 of MOV 35 and end 30a of the conductive spring terminal 30, and the solder disposed therebetween form the thermal disconnect 30d.

The MOV 35 includes a variety of surge protection capabilities and operating temperature ratings. For example, the MOV 35 may comprise various pin configurations to accommodate connections to the input lines 20a-c and/or output lines 25a-c. The MOV 35 may be coated with epoxy and disposed on, within, and/or under the bottom portion 15a of housing 15.

The conductive protrusion 36a of the first terminal 36 of MOV 35 extends substantially horizontally away from and/or orthogonal to surface 35a of MOV 35 and may be connected to end 30a of conductive spring terminal 30. Although the conductive spring terminal 30 is illustrated as having a particular shape and configuration, many alternative shapes and configurations are contemplated and may be implemented in place of those shown and described above without departing from the present disclosure. Also, output line 25c may be a ground line and may be connected to one or more components of the circuit protection device 100 as discussed in more detail below.

An inductor 40 may be included in the circuit protection device 100. The inductor 40 may be mounted to the bottom portion 15a of housing 15 and can be electrically connected to MOV 35 via second terminal 37. The inductor 40 may be electrically connected to output line 25a. By including the inductor 40 on the circuit protection device 100, an impulse current resulting from an overvoltage condition first travels through the MOV 35 and the MOV 35 withstands most, if not all, of the impulse current.

A transient voltage suppression (TVS) diode 45 may also be mounted to the bottom portion 15a of housing 15 and may be electrically connected to output line 25a and to output line 25b A gas discharge tube (GDT) 50 may also be mounted to the bottom portion 15a of housing 15 and may be electrically connected to both the TVS diode 45 via the output line 25b and to the MOV 35 via the input line 20b.

FIG. 1B is a perspective view of circuit protection device 100 in an open circuit condition in accordance with an embodiment of the present disclosure. During normal operation where an overvoltage condition does not exist as illustrated in FIG. 1A, the circuit protection device 100 is in a closed position. When the circuit protection device 100 is in a closed position, the MOV 35 is connected to end 30a of conductive spring terminal 30 to form a thermal disconnect 30d. During this normal operation, the MOV 35 does not produce a sufficient amount of heat to melt the thermal disconnect 30d. In other words, the MOV does not produce enough heat to melt the solder connection disposed between conductive protrusion 36a of first terminal 36 and end 30a of conductive spring terminal 30. However, since the MOV 35 is a voltage sensitive device, the occurrence of an overvoltage condition that exceeds the MOV's rated voltage causes the MOV 35 to heat up.

When an overvoltage condition occurs, heat generated by the MOV 35 melts the thermal disconnect 30d. In other words, the heat generated by the MOV during an overvoltage condition melts the solder disposed between conductive protrusion 36a of first terminal 36 and end 30a of conductive spring terminal 30 and the thermal disconnect 30d formed by the connection of these components is disconnected or opened. As a result, the conductive spring terminal 30 is displaced away from conductive protrusion 36a of first terminal 36 of MOV 35. Accordingly, an open circuit is created by the MOV 35 becoming disconnected from end 30a of the conductive spring terminal 30. That is, end 30a of the conductive spring terminal 30 is decoupled from the MOV 35 to form an open circuit which prevents the overvoltage condition from damaging a device or circuit that is protected by the circuit protection device 100.

Figure 2:
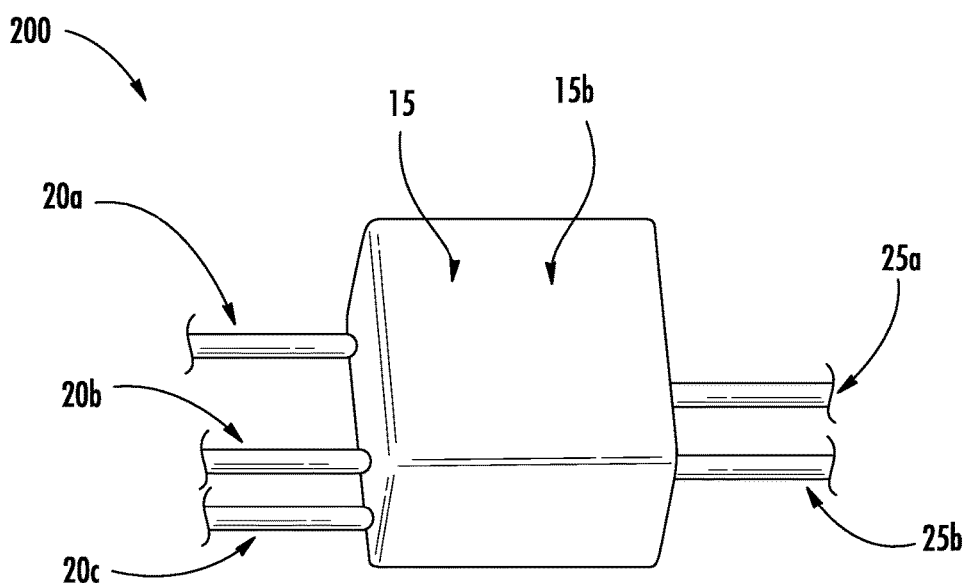
FIG. 2 is a perspective view of a circuit protection module in accordance with an embodiment of the present disclosure.

FIG. 2 is a perspective view of a module 200 in accordance with an embodiment of the present disclosure. The module 200 may include a housing 15, input lines 20a, 20b, and 20c, and output lines 25a and 25b. The housing 15 includes a cover 15b which defines a chamber or cavity within which a circuit protection device of the present disclosure may be positioned. The input line 20a may be a load line or load wire, the input line 20b may be a neutral, and the input line 20c may be a ground. The output line 25b may be a corresponding load line or load wire and the output line 25b may be a corresponding neutral.

Figure 3:
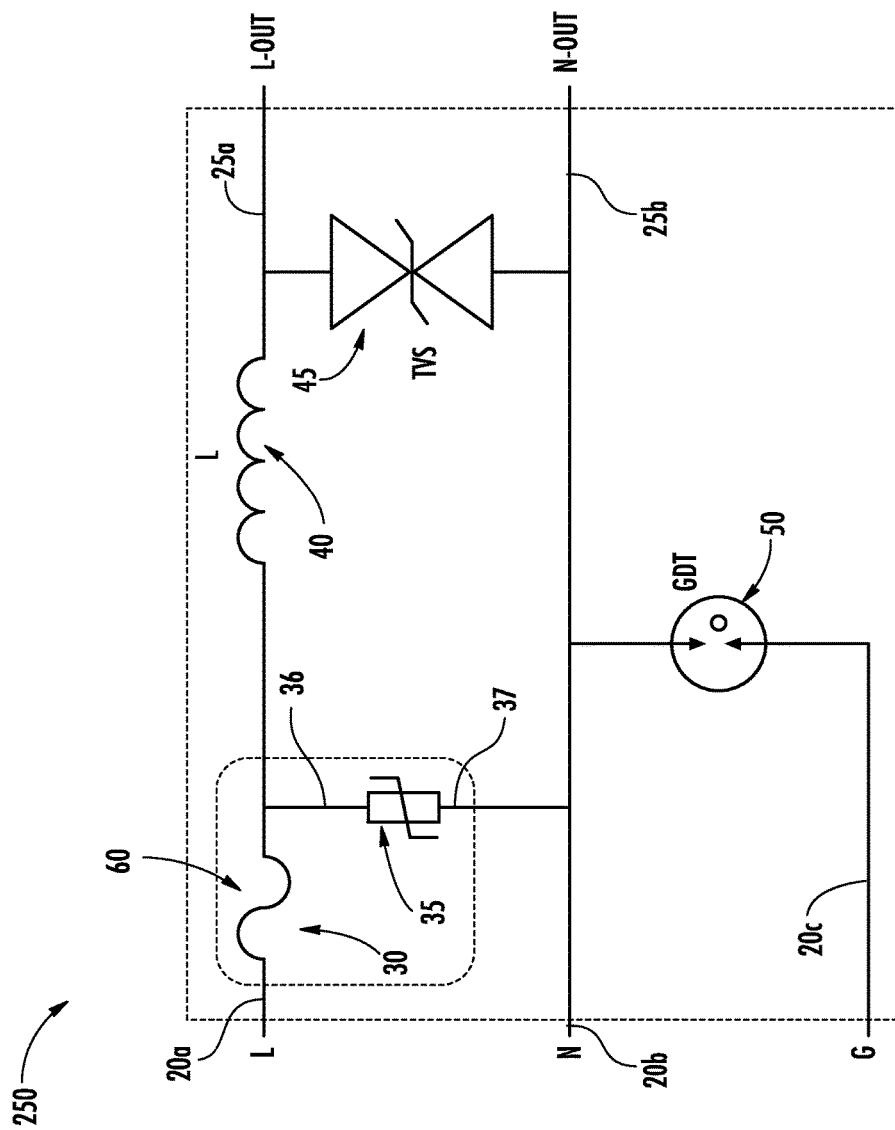
FIG. 3 is a schematic of a circuit protection device in accordance with an embodiment of the present disclosure.
Figure 4:
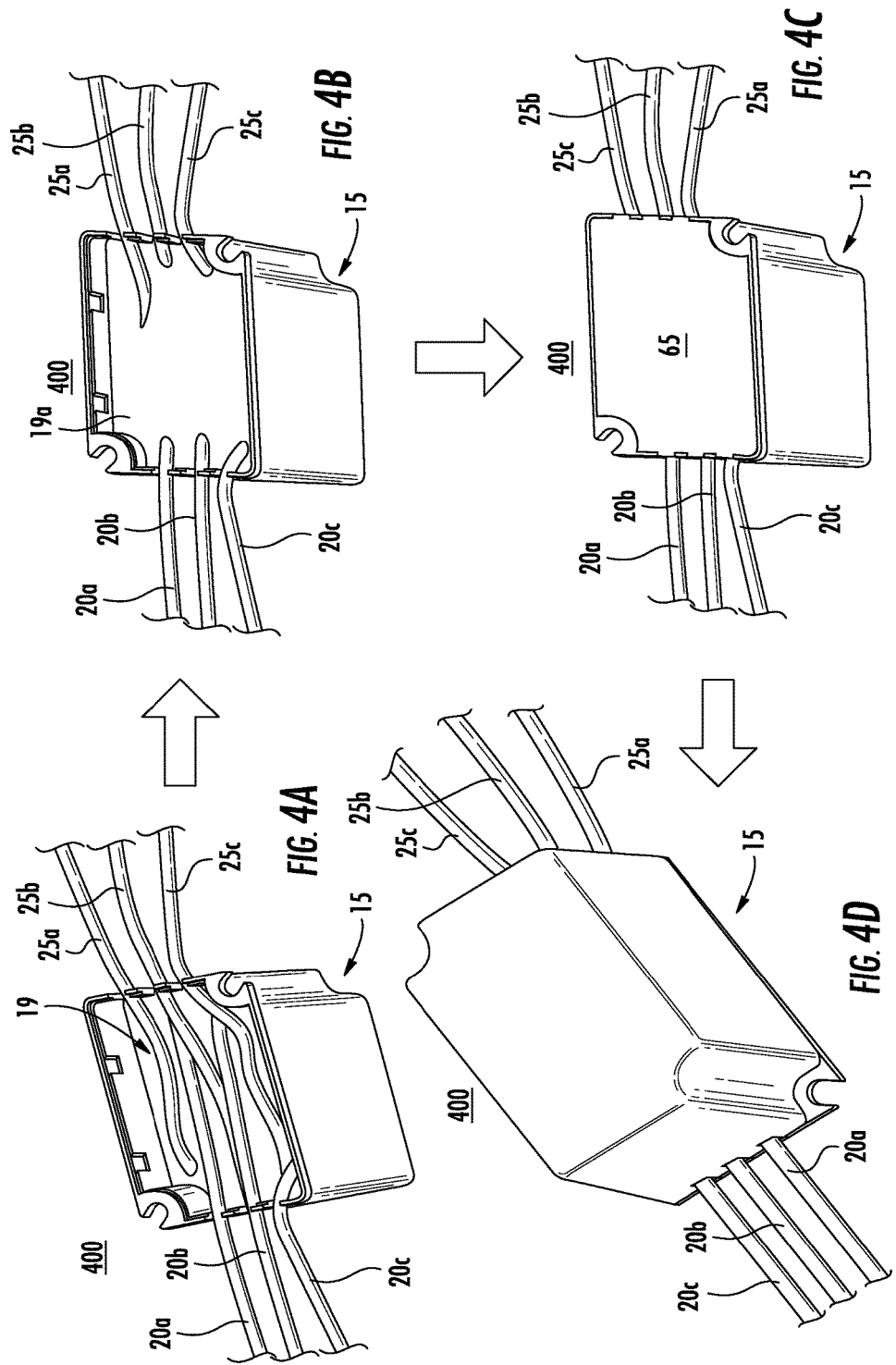
FIGS. 4A-4D illustrate assembly of a circuit protection module in accordance with an embodiment of the present disclosure.

The circuit protection device 250 shown in FIG. 3 may be housed within module 200. The input and output lines 20a-c, 25a, and 25b can be used to connect the circuit protection device 250 between a source of power (not shown) and a device or circuit to be protected (not shown) in accordance with an embodiment of the present disclosure. It should be noted that in one embodiment, the input line 20c can extend through the housing 15 to act as a third output line. That is, the module 200 can include a third output that can be a ground and can be coupled to the input line 20c. In this manner, the module 200 is configured to contain the circuit protection device 100 shown in FIG. 1A.

FIG. 3 is a schematic of a circuit protection device 250 in a serial configuration in accordance with an embodiment of the present disclosure. The circuit protection device 250 can be a serial connection implementation of the circuit protection device 100 contained within the module 200. In various embodiments, as illustrated in FIG. 3, the circuit protection device 250 includes conductive spring terminal 30 coupled to MOV 35 and coupled to the input line 20a. The input line 20a line may be a load line, the input line 20b may be a neutral line and input line 20c may be a ground line. The conductive spring terminal 30 coupled to the MOV 35 forms a fuse 60. In other words, the conductive spring terminal 30 and the MOV 35 may be soldered together to form the fuse 60 which operates as a thermal disconnect 30d for the circuit protection device 250. The inductor 40 is coupled to the MOV 35 and conductive spring terminal 30 as well as output line 25a. The TVS diode 45 may be coupled to the inductor 40, output lines 25a and 25b, and MOV 35. A GDT 50 may be coupled between the MOV 35, TVS diode 45 and input lines 20b, 20c. The conductive spring terminal 30 may be biased such that upon occurrence of an overvoltage condition, heat generated by the MOV 35 melts the thermal connection (i.e., solder) disconnecting the conductive spring terminal 30 from the MOV 35, thereby creating an opening circuit. Because the circuit protection device 250 includes both input lines (e.g., lines 20a-c) and output lines (e.g., lines 25a-b), the circuit protection device 250 can be considered as providing a serial type arrangement or configuration of a circuit protection device.

The connection between the conductive spring terminal 30 and the MOV 35 in the circuit protection devices of the present disclosure may be formed by a low temperature solder fillet by soldering the conductive spring terminal 30 at one end (e.g., end 30a) to a terminal (e.g., protrusion 36a of first terminal 36) of MOV 35. This connection—which forms a thermal disconnect—may be coupled to the input line 20a.

FIGS. 4A-4D illustrate assembly of a circuit protection module 400. The circuit protection module 400 can be assembled to include the circuit protection device 100 implemented in accordance with the circuit protection device 250 as illustrated in FIG. 3.

FIG. 4A is a cut-away perspective view of a bottom or underside of an unfilled cavity or chamber 19 of housing 15 of the circuit protection module 400 in accordance with an embodiment of the present disclosure. A first stage of assembly is depicted for the circuit protection module 400 in FIG. 4A. The housing 15 allows input lines 20a-c to enter the chamber 19. The input lines 20a-c may extend into the chamber 19 and may be coupled to the constituent components of a circuit protection device of the present disclosure (such as, for example, the circuit protection device 100). Output lines exit the chamber 19 of the circuit protection module 400 as shown in FIG. 4A.

FIG. 4B is a cut-away perspective view of a bottom or underside of a cavity of the housing 15 with a portion of the chamber 19 filled with a potting material 19a. In particular, a portion of the housing 15 may be filled with a potting epoxy 55 or other solid or gelatinous compound, such as a thermo-setting plastic or silicone rubber gel, using a potting process. The input lines 20a-c (as well as, for example, a circuit protection device of the present disclosure) may thereby be encased in the potting material 19a. The potting material 19a provides protection against shock and vibration and can prevent the ingress of moisture and corrosive agents which might otherwise damage or deteriorate electrical connections between the input lines 20a-c and a circuit protection device of the present disclosure (such as, for example, the circuit protection device 100).

FIG. 4C is a perspective view of a bottom or underside of the housing 15 having a cover 65 placed over the bottom or underside of the housing 15. Once the chamber 19 is filled with the potting material 19a, cover 65 may be placed on the housing 15 for sealing the chamber 19 providing protection for the components contained therein. It will be appreciated by those of ordinary skill in the art that the housing 15 of the circuit protection module 400 may be embodied by a variety of alternative structures and configurations that facilitate the electrical connections described herein and that also provide containment and protection of circuit protection devices of the present disclosure, such as the circuit protection device 100. FIG. 4D shows a perspective view of a fully assembled circuit protection module 400 with cover 65 in place.

Figure 5:
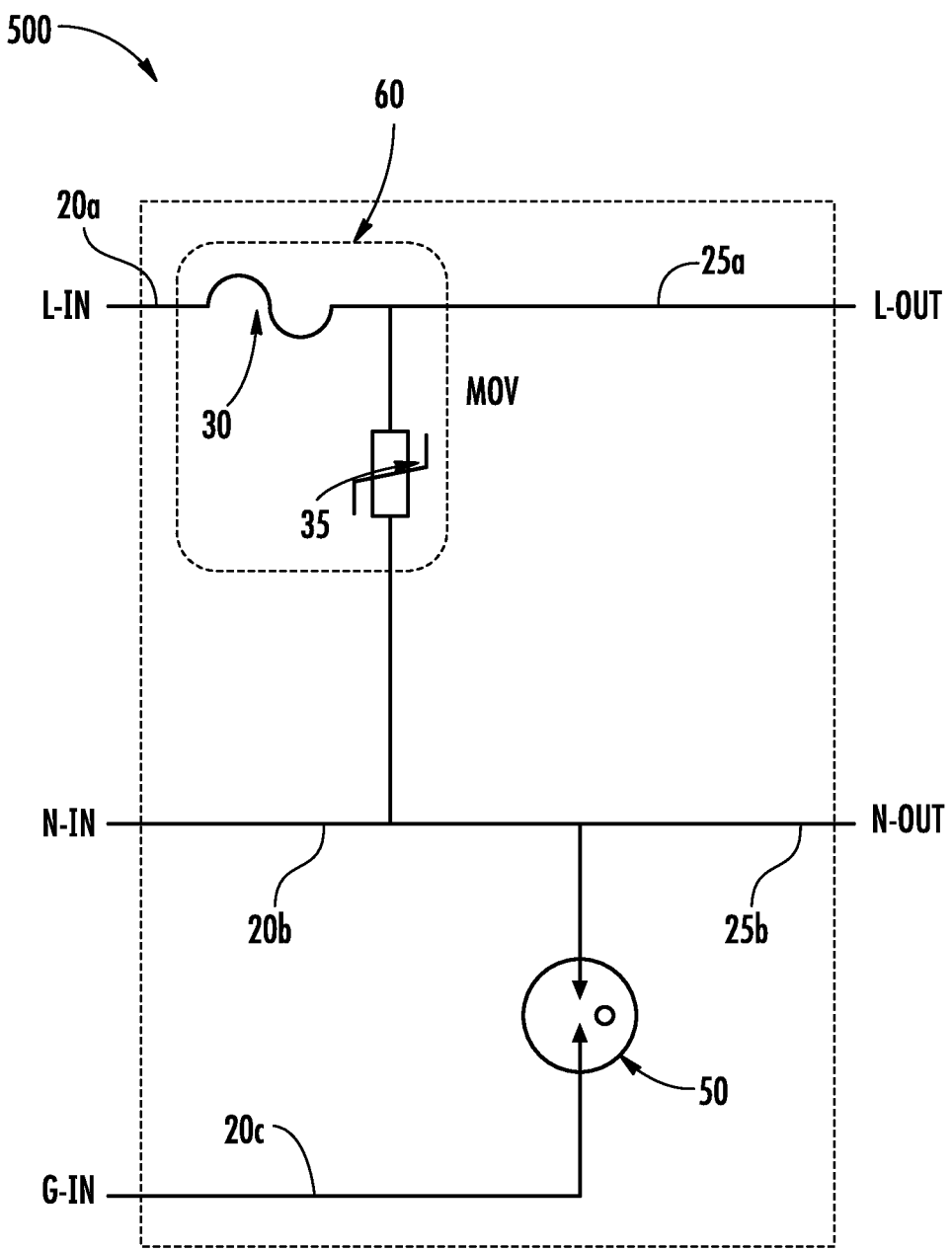
FIG. 5 is a schematic of a third circuit protection device in accordance with an embodiment of the present disclosure.

FIG. 5 illustrates a schematic of an alternative circuit protection device 500 which can be implemented in a serial connection configuration as shown but is not so limited. That is, the circuit protection device 500 can alternatively be implemented in a parallel connection configuration. Further, the circuit protection device 500 can be implemented as a portion of module 200, or circuit protection module 400 shown in FIGS. 2, 4A-4D.

In various embodiments, the circuit protection device 500 includes conductive spring terminal 30 electrically connected to input line 20*a* and MOV 35. The conductive spring terminal 30 and the MOV 35 may be electrically coupled via a solder connection to form fuse 60, which operates as a thermal disconnect. The fuse 60 is coupled to the output line 25*a*. The input line 20*b* may be coupled to the output line 25*b*. The MOV 35 can be coupled to the input line 20*b*. The GDT 50 is coupled between the MOV 35 and the output line 25*b*, and also coupled to input line 20*c*. The input line 20*a* line may be a load line. The input line 20*b* may be a neutral line. The input line 20*c* may be a ground line.

The conductive spring terminal 30 may be biased such that upon occurrence of an overvoltage condition, heat generated by the MOV 35 melts the thermal connection (i.e., the low temperature solder) of the fuse 60 to open the fuse 60 by disconnecting the conductive spring terminal 30 from a first terminal of MOV 35, thereby creating an opening circuit. Because the circuit protection device 500 includes both input lines (e.g., lines 20*a-c*) and output lines (e.g., lines 25*a-b*), the circuit protection device 500 can be considered as providing a serial type arrangement or configuration of a protection circuit of the present disclosure, but is not so limited.

Figure 6:
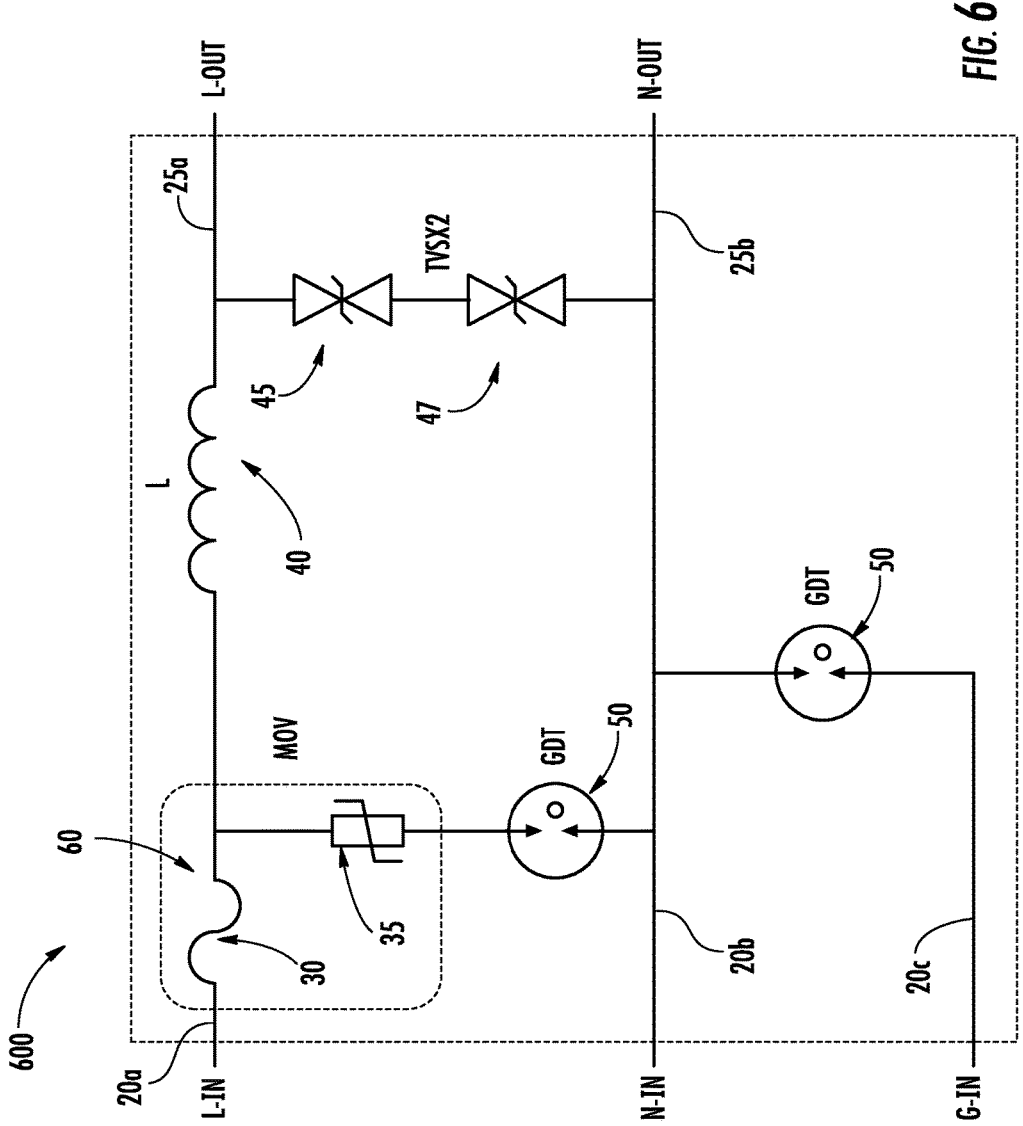
FIG. 6 is a schematic of a fourth circuit protection device in accordance with an embodiment of the present disclosure.

FIG. 6 is a schematic of a circuit protection device 600 implemented in a serial connection configuration, but is not so limited. Further, the circuit protection device 600 can be implemented as a portion of module 200 or circuit protection module 400 shown in FIGS. 2, 4A-4D.

In various embodiments, the circuit protection device 600 includes conductive spring terminal 30 electrically connected to input line 20*a* and MOV 35. The conductive spring terminal 30 and the MOV 35 may be electrically coupled via a solder connection to form fuse 60, which operates as a thermal disconnect. The MOV 35 may also be coupled to a first GDT 55. The inductor 40 can be coupled to the fuse 60 (e.g., the MOV 35 and the conductive spring terminal 30 coupled together by solder) and output line 25*a*. A first TVS diode, such as TVS diode 45, may be coupled to both the inductor 40 and output line 25*a*, and coupled to a second TVS diode 47. TVS diode 47 is coupled to both the GDT 55 and output line 25*b*.

A second GDT 50 may be coupled between GDT 55 and TVS diode 47 and input line 20*c*. The input line 20*a* may be a load line. The input line 20*b* may be a neutral line. The input line 20*c* may be a ground line. The conductive spring terminal 30 is biased such that upon occurrence of an overvoltage condition, heat generated by the MOV 35 melts solder of the fuse 60 to open the fuse 60 by disconnecting the conductive spring terminal 30 from a first terminal of MOV 35, thereby creating an opening circuit. Because the circuit protection device 600 includes both input lines 20*a-c* and output lines 25*a-b*, the circuit protection device 600 can be considered as providing a serial type arrangement or configuration of a protection device of the present disclosure, but is not so limited.

The circuit protection devices 500 and 600 illustrated in FIGS. 5 and 6 respectively, as described herein, include numerous advantageous over conventional protection circuits. The protection circuits described herein can include a minimal number of components. For example, as shown in FIG. 5, the circuit protection device 500 can include as few components as one spring, one MOV, and one GDT. In an alternative embodiment, as shown in FIG. 6, the circuit protection device 600 can include one spring, one MOV, one or more TVS diodes, and two GDTs. The determination on whether to use one or two TVS diodes is made based on the consideration that a high voltage TVS diode has relatively low surge capability. Accordingly, the use of two low voltage TVS diodes in series may be used to achieve the high surge capability while avoiding the expense of a high cost single high surge TVS diode. Alternatively, the use of one high surge TVS diode may also be used for the module.

The circuit protection devices 500 and 600 also provide surge protection across all line/load, neutral, and grounds lines. For example, as shown in FIG. 6, the MOV 35 and the GDT 55 may be in a parallel connection with the TVS diodes 45, 47 for load-to-neutral surge protection. The GDT 50 may provide neutral-to-ground surge protection. The MOV 35, the GDT 55, the GDT 50, and/or the TVS diodes 45, 47 (or any combination thereof) provide load-to-ground surge protection. The circuit protection devices described herein also provide a low clamping voltage. For example, as shown in FIG. 6, the TVS diodes 45, 47 can provide a low clamping voltage across the load and neutral lines.

The circuit protection devices as described herein can be assembled into a small, compact package suitable for light emitting diode (LED) applications. Further, by using low temperature solder to form the thermal connection between a conductive spring terminal (e.g., 30) and an MOV (e.g., 35), a fast response to an overheating condition of the MOV caused by a sustained overvoltage condition, or high leakage current, or end of MOV life, can be obtained.

Overall, circuit protection devices as described herein can provide surge protection for load-to-neutral, load-to-ground, and neutral-to-ground, can provide a low clamping voltage, and can quickly disconnect a load from the circuit protection devices during a sustained overvoltage condition, high leakage current condition, or at the end life of the MOV when an overheating condition may occur.

Figure 7:
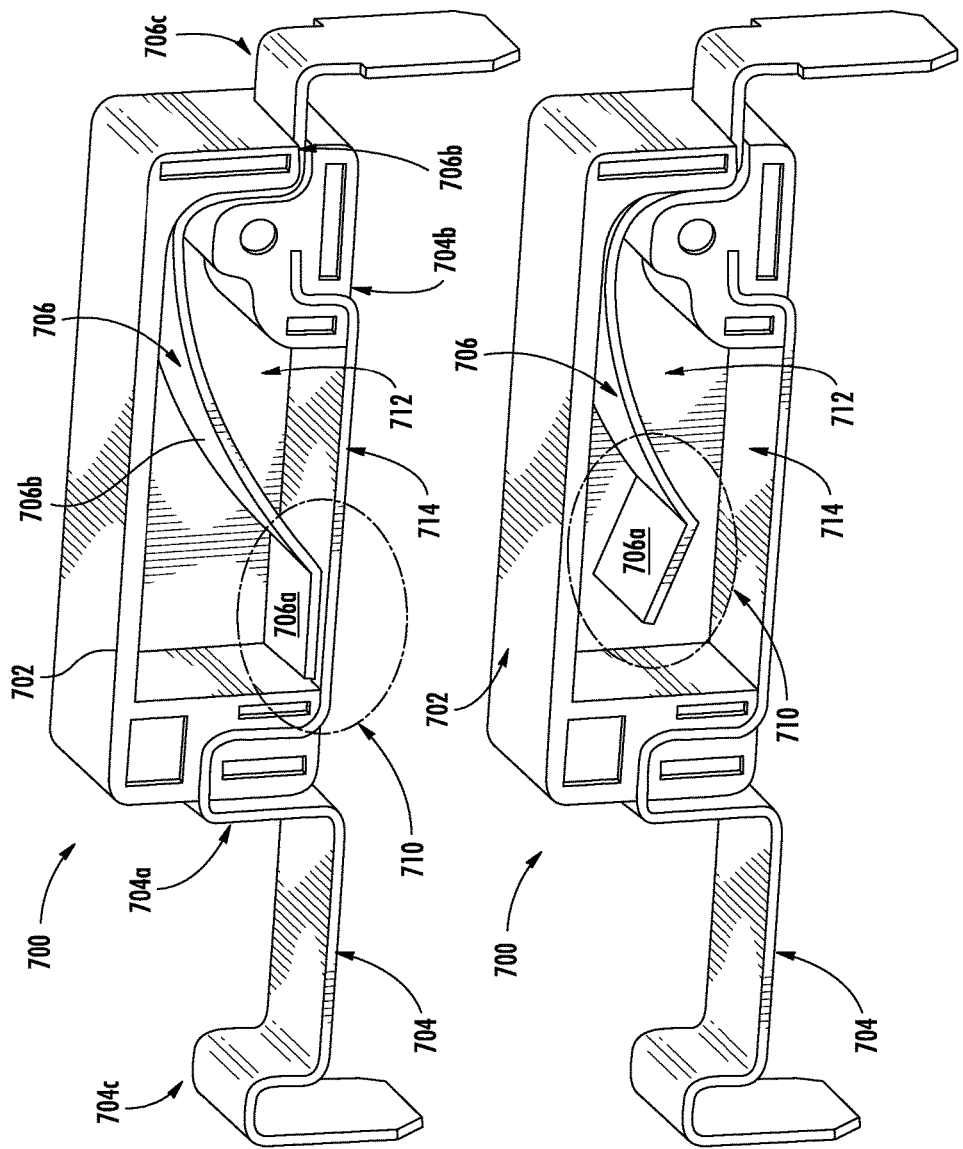
FIG. 7A is a perspective view of a high surge thermal disconnect device in accordance with an embodiment of the present disclosure.
FIG. 7B is a perspective view of the high surge thermal disconnect device depicted in FIG. 7A.

FIG. 7A is a perspective view of a thermal disconnect device 700 which includes a housing 702, a first terminal 704, and a second terminal 706. The second terminal 706 can be a spring terminal biased away from a base portion 714 of first terminal 704. The first terminal 704 and the second terminal 706 can be coupled or attached to form a thermal disconnect 710. More specifically, an end portion 706*a* of second terminal 706 may be soldered to a base portion 714 of first terminal 704. The thermal disconnect 710 can be positioned within at least a portion of a chamber 712 of housing 702. The first terminal 704 and the second terminal 706 can be coupled or connected together using a low temperature solder so as to form the thermal disconnect 710.

The thermal disconnect device 700 can be used to form the thermal disconnect (e.g., 30*d* shown in FIG. 1A) or fuse 60 connection between spring terminal 35 and MOV 35 as described in relation to the circuit protection devices 250, 500, and 600. That is, the thermal disconnect device 700 can form a portion of a connection or coupling between a spring conductor and a portion of an MOV stack in any of the protection circuits described herein.

Figure 8:
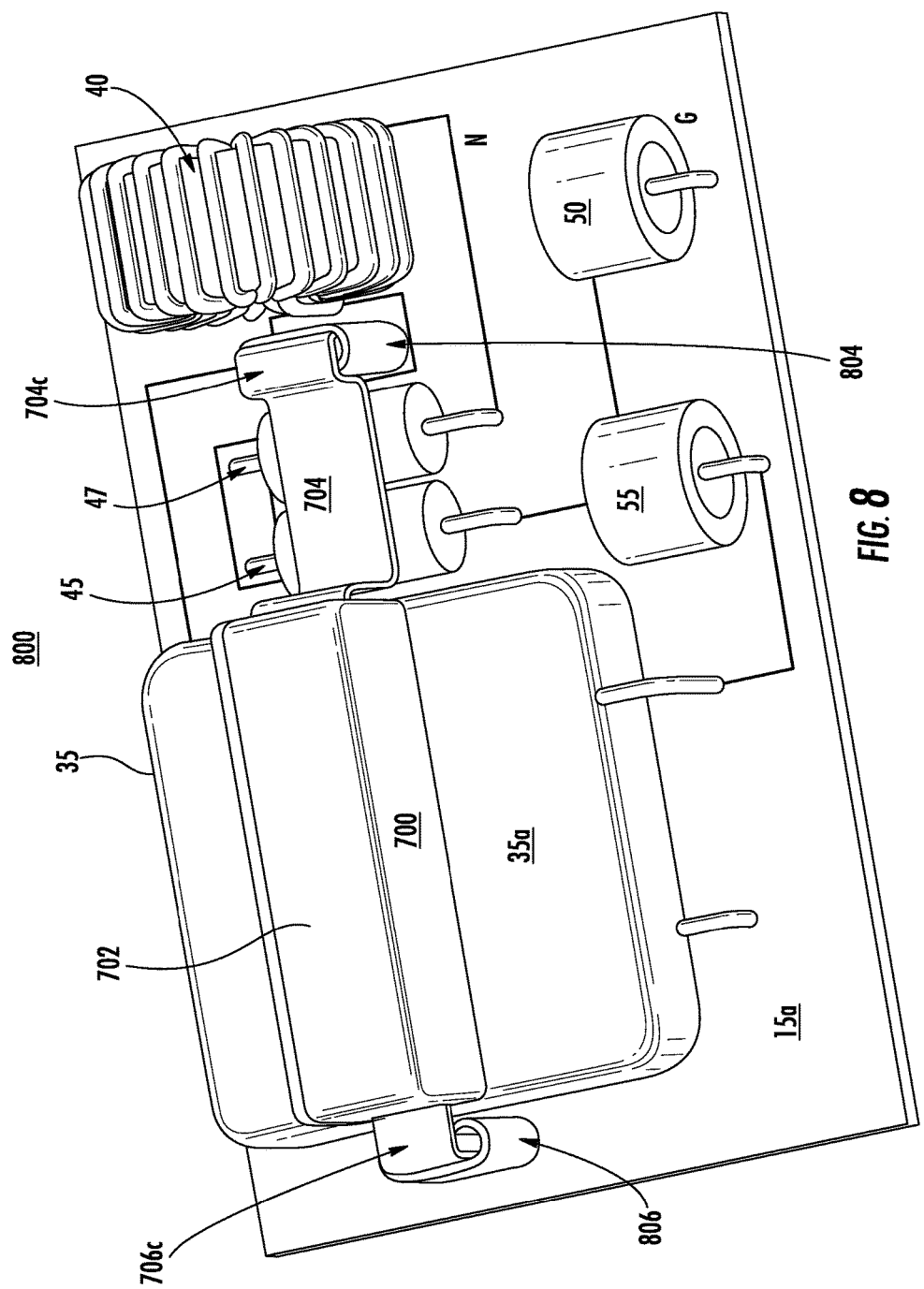
FIG. 8 is a perspective view of various components of an alternative circuit protection device in accordance with an embodiment of the present disclosure.

The first terminal 704 may include a portion 704*a* which is bent or shaped, such as in an upside down U-shape, along any portion thereof for retention to an end of housing 702. The first terminal 704 can also be bent or shaped, such as in an S-shape, along any portion thereof, such as portion 704*b* for coupling to one or more portions of the housing 702. That is, the first terminal 704 may have one or more portions bent or shaped for being coupled or fitted to, for example, two separate portions of the housing 702 for retention therein. The first terminal 704 may also form a base or base portion 714 of the housing 702 for enclosing chamber 712. The base portion 714 of the first terminal 704 is in direct contact with a surface 35*a* of MOV 35 as shown in FIG. 8. Specifically, the base portion 714 of the first terminal 704 is contiguous with surface 35a of MOV 35 such that heat generated by MOV 35 during an overvoltage condition is transferred to base portion 714 of first terminal 704 which heats the solder connecting end portion 706a of second terminal 706 and base portion 714 as described in more detail with reference to FIG. 8.

The second terminal 706 can also be bent or shaped, such as in an S-shape, along portion 706b thereof for retention to an end of the housing 702. In various embodiments, the second terminal 706 is configured such that one portion 706b is coupled or fitted to housing 702, as compared to first terminal 704 having two portions 704a and 704b coupled or fitted to housing 702.

The portion 706b of second terminal 706 has a bowed or arcuate shape with end portion 706a having a planar configuration for connection to base portion 714. Also, base portion 714 of first terminal 704 that encloses chamber 712 may be planar. End portion 706a of second terminal 706 is configured for making contact with base portion 714 of first terminal 704. In other words, end portion 706a which may be substantially planar is coupled to base portion 714 of first terminal 704 with solder, thereby forming the thermal disconnect 710. The chamber 712 of the housing 702 can be of sufficient size so as to allow the second terminal 706 which is biased away from base portion 714 of first terminal 704 to move, retract, and/or spring away from base portion 714 of first terminal 704 within chamber 712. When the solder connecting end portion 706a to base portion 714 melts as a result of the heat generated by MOV 35 during an overvoltage condition, second terminal 706 springs away from first terminal 704.

The first terminal 704 and the second terminal 706 may also include ends 704c and 706c, respectively that extend beyond the perimeter of housing 702. Ends 704c and 706c may be bent or shaped to secure the thermal disconnect device 700 to an MOV terminal and/or a circuit board. As such, the thermal disconnect device 700 may be easily mounted onto and/or removed from an MOV or circuit board via ends 704c and 706c. For example, the thermal disconnect device 700 can straddle an MOV. This enables the thermal disconnect device 700 to be a replaceable component of a circuit protection device as described herein. For example, after a surge protection event has occurred and end portion 706a is no longer connected to base portion 714 of first terminal 704, the entire thermal disconnect device 700 can be removed and replaced with another similar unit having a first terminal 704 coupled to a second terminal 706.

FIG. 7A illustrates operation of the thermal disconnect device 700 prior to a surge event. In particular, prior to a surge event, the thermal disconnect device 700 is coupled and mounted to an MOV, but during normal operation the MOV does not produce a sufficient amount of heat to activate the thermal disconnect 710 (i.e., heat from the MOV is not sufficient to melt the solder connection between end portion 706a of second terminal 706 and base portion 714 of first terminal 704). As such, the thermal disconnect 710 remains in a connected state with the first and second terminals 704, 706 coupled together.

The operating characteristics of the thermal disconnect device 700 provides various benefits and advantages. For example, the thermal disconnect device 700 can provide a high surge capability greater than 40 kilo Amps (kA) and may sustain a current of greater than 10 amps (A). Further, by positioning the base portion 714 of the first terminal 704 onto a surface of an MOV, the low temperature solder joint of the thermal disconnect 710 can sense heat more directly from the MOV since a large portion of the surface area of the MOV is thermally coupled to the base portion 714. This in turn can increase the response time and/or sensitivity of the thermal disconnect 710 in an overheating condition. In other words, the low temperature solder joint of the thermal disconnect 710 provides for a quicker response to an overvoltage condition generated by the MOV to which it is coupled since a greater surface area of the first terminal 704 is in thermal contact with the MOV thereby allowing the low temperature solder joint of the thermal disconnect 710 to be melted or disconnected. The thermal disconnect device 700 provides for and allows a high operating voltage of greater than 1000 volts (V), provides compact packaging, and provides for a more efficient mounting design on an MOV or MOV stack.

FIG. 7B illustrates the thermal disconnect 710 in a disconnected state where end portion 706a of second terminal 706 is displaced from base portion 714 of first terminal 704. In particular, once the MOV on which the thermal disconnect device 700 is mounted (e.g., MOV 35) has produced a level of heat sufficient to melt the solder connection coupling end portion 706a and base portion 714, the second terminal 706 retracts or "springs" away from base portion 714 of first terminal 704 within chamber 712 of the housing 702. That is, the melting of the low temperature solder joint of thermal disconnect 710 decouples the second terminal 706 from the first terminal 704. With the first terminal 704 and the second terminal 706 disconnected (e.g., decoupled) from one another, an open circuit is formed, enabling a protection circuit that includes the thermal disconnect device 700 to prevent or reduce damage to additional circuits to which the thermal disconnect device 700 may be coupled.

FIG. 8 is a perspective view of various components of an alternative circuit protection device 800 utilizing the thermal disconnect device 700 shown in FIGS. 7A and 7B. The circuit protection device 800 can be configured according to any of the circuit protection devices 250, 500, or 600.

In various embodiments, the circuit protection device 800 includes the thermal disconnect device 700, MOV 35, GDTs 50 and 55, TVS diodes 45 and 47, inductor 40, a first connector 810, and a second connector 812 arranged on the bottom portion 15a of housing 15. As an example, these constituent components of the circuit protection device 800 can be arranged according to the schematic of circuit protection device 600 depicted in FIG. 6.

The first connector 804 can be a clip or other connection apparatus for receiving and securing end 704c of first terminal 704. The second connector 806 can also be a clip or other connection apparatus for receiving and securing an end 706c of second terminal 706. The first and second connectors 804, 806 can secure the thermal disconnect device 700 to the circuit protection device 800. In particular, the thermal disconnect device 700 can be mounted contiguous with surface 35a of MOV 35 by way of the first and second connectors 804, 806 such that surface 35a of MOV 35 is in contact with base portion 714 of first terminal 704. Further, the thermal disconnect device 700 can be quickly mounted and/or removed from the bottom portion 15a of housing 15 using the first and second connectors 804, 806. That is, the thermal disconnect device 700 may be mounted and/or removed and interchanged without compromising the integrity of the other components of the circuit protection device 800. For example, if the second terminal 706 breaks and/or becomes disconnected from the first terminal 704, the thermal disconnect device 700 may be quickly removed and replaced with an alternative thermal disconnect device 700. The arrangement of the thermal disconnect device 700 also reduces manufacturing complexity by providing an efficient manner for positioning the thermal disconnect 710 (shown in FIGS. 7A, &B) of the thermal disconnect device 700 in proximity to MOV 35.

As mentioned above, the base portion 714 of first terminal 704 is disposed on surface 35a of MOV 35. During a protection event—for example, during a sustained overvoltage condition—the heat generated by the MOV 35 melts the solder connection between base portion 714 of first terminal 704 and end portion 706a of second terminal 706, thereby creating an open circuit. As a result, the circuit protection device 800 protects components or circuits coupled to the circuit protection device 800 from fault conditions.

Figure 9:
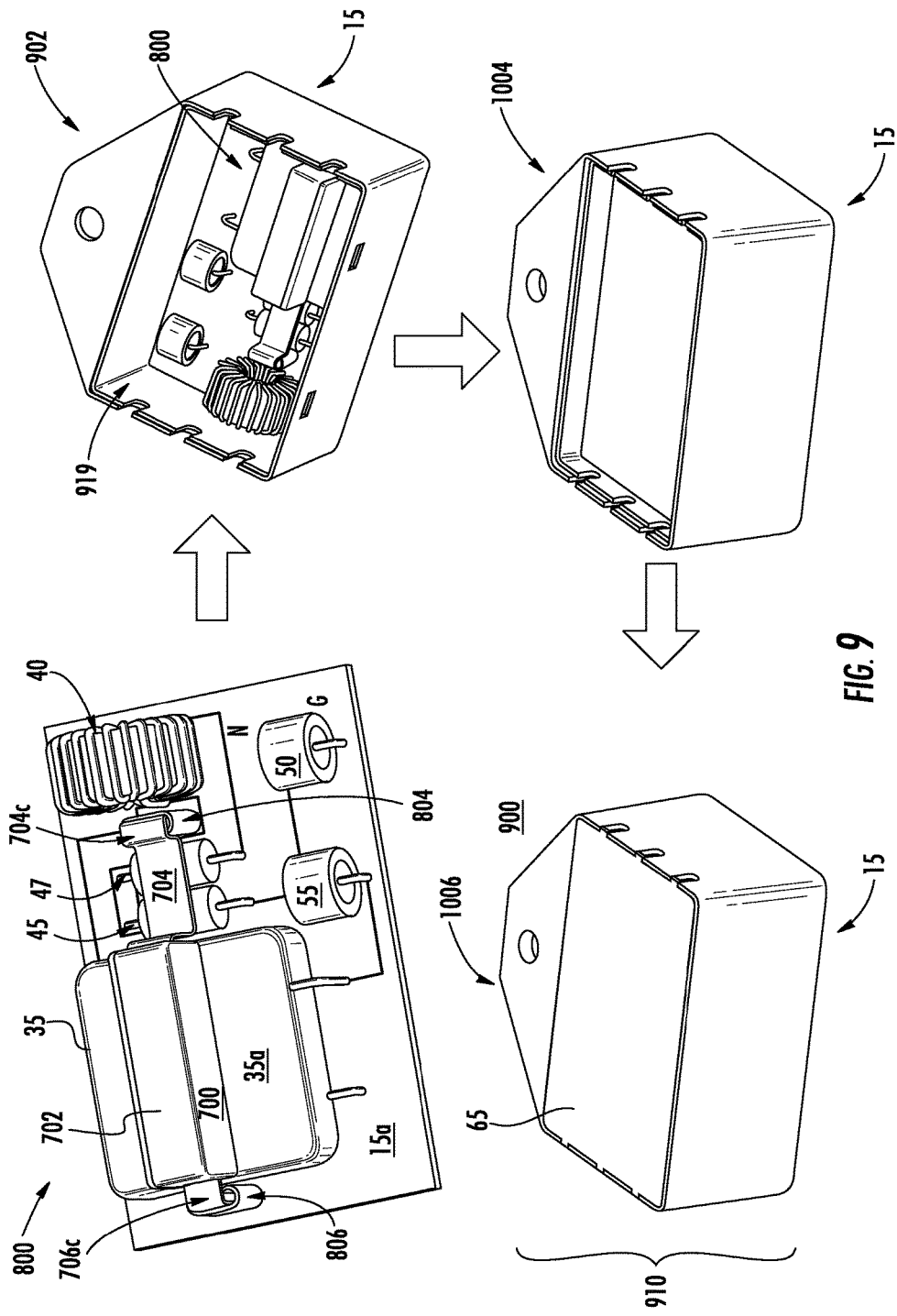
FIG. 9 illustrates assembly of a module containing the circuit protection device of FIG. 8 in accordance with an embodiment of the present disclosure.

FIG. 9 illustrates an assembly process 900 of the circuit protection device 800 into a module 910. Although the circuit protection device 800 is being used to illustrate the assembly process 900, the description is applicable to the circuit protection devices shown in FIGS. 1-6. In a first stage of assembly 902, the circuit protection device 800 is disposed within housing 15. In a second stage 904, the housing 15 may be filled with a potting material 19a such as an epoxy or a solid or a gelatinous compound, such as a thermosetting plastic or silicone rubber gel, using a potting process. As described earlier, the potting material 19a may provide protection against shock and vibration and can prevent the ingress of moisture and corrosive agents which might otherwise damage or deteriorate the circuit protection device 800. In the next stage of assembly 906, a cover 65 may be placed over the potting material 19a, closing cavity 919, thereby forming the assembled module 910. It will be appreciated by those of ordinary skill in the art that the housing 15 may be embodied by a variety of alternative structures and configurations that facilitate the electrical connections described herein and that also provide containment of circuit protection devices of the present disclosure.

Figure 10:
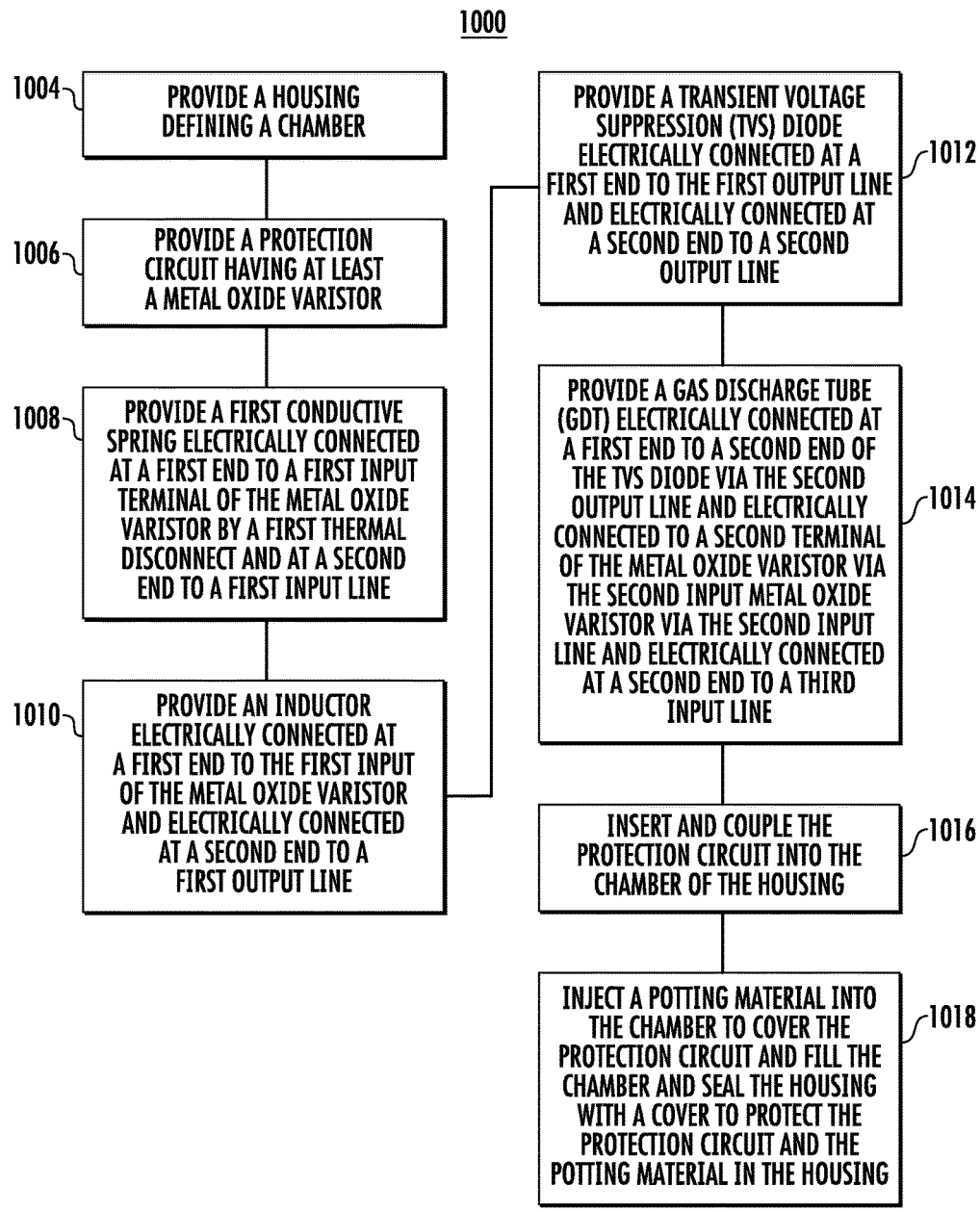
FIG. 10 is a flow diagram of a method for manufacturing a circuit protection device or module in accordance with an embodiment of the present disclosure.

FIG. 10 is a flow diagram of a method 1000 for manufacturing a circuit protection device or assemble the protection circuits or modules described herein.

The method of manufacturing includes providing a housing defining a chamber at block 1004. A circuit protection device, such as a printed circuit board (PCB) or other circuit substrate, having an MOV is provided at block 1106. The circuit protection device may include a plurality of circuit elements (e.g., MOV, TVS diode, GDT, and/or input/output lines, etc.) attached to a bottom portion 15a. At block 1006, the MOV is coupled to the bottom portion 15a of the protection circuit. At block 1008, a conductive spring is provided that is electrically connected at a first end to a first input terminal of an MOV via a first thermal disconnect and at a second end to a first input line, wherein the first conductive spring is biased away from the first input terminal of the MOV0. At block 1008, the thermal disconnect device 700 described in FIGS. 7-8 may be provided by the method of manufacturing 1000 which would replace the thermal disconnect configurations shown in FIG. 1-6. Next, the method of manufacturing 1000 provides (as part of the protection circuit) an inductor electrically connected at a first end to the first terminal of the MOV and electrically connected at a second end to a first output line at block 1010. The method of manufacturing 1000 provides (as part of the protection circuit) a TVS diode electrically connected at a first end to the first output line and electrically connected at a second end to a second output line at block 1012. An alternative to using one TVS diode which is relatively expensive, is to use two low voltage diodes in series to achieve the same high surge capability. The method of manufacturing 1000 provides (as part of the protection circuit) a GDT electrically connected at a first end to a second end of the TVS diode via the second output line and electrically connected to a second terminal of the MOV via a second input line, the GDT is also electrically connected at a second end to a third input line, at block 1014. In this manner, when an overvoltage condition occurs, heat generated by the MOV stack melts the thermal disconnect to allow the conductive spring terminal to be displaced away from the MOV terminal to define an open circuit. It should be noted that at least two GDTs may be used in block 1014 instead of just one GDT. Each circuit element described in blocks 1006-1014 can be circuit elements forming and included in the protection circuit. From block 1016, the method of manufacturing may include inserting the protection circuit into the chamber of the housing. At block 1018, the chamber of the housing may be filled with a potting material (e.g., epoxy), and then the housing may be sealed with a cover for securing the protection circuit and the potting material within the housing. In this manner, the protection circuit and the potting material are enclosed and protected by the housing.

Figure 11:
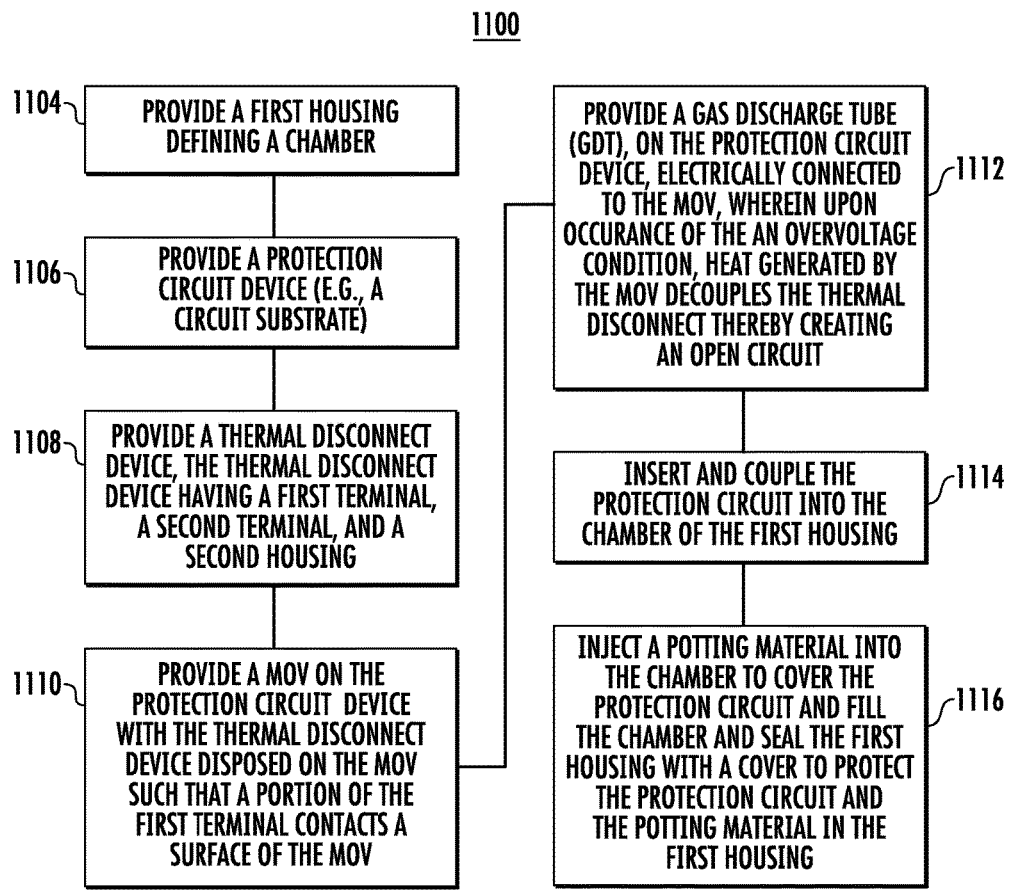
FIG. 11 is a flow diagram of an additional method for manufacturing a circuit protection device or module in accordance with an embodiment of the present disclosure.

FIG. 11 is a flow diagram of a method for manufacturing 1100 a circuit protection device or assemble the protection circuits or modules described herein.

At block 1104, a first housing defining a chamber is provided. A protection circuit device, such as a printed circuit board (PCB) or other circuit substrate, is provided at block 1106. The protection circuit device may include a base section (e.g., the PCB or other circuit substrate) for securing each circuit element (e.g., MOV, TVS diode, GDT, and/or input/output lines, etc.) thereto. Also, the protection circuit device may include one or more input/output lines and connected to the various circuit elements for either a serial configuration and/or a parallel configuration, as described herein. The method 1100 provides a thermal disconnect device (as part of the protection circuit) having a first terminal, a second terminal, and a second housing at block 1108. The first terminal can be coupled to the second terminal to form a fuse, and at least a portion of the first terminal and at least a portion of the second terminal can be secured to the second housing. At block 1110, the method of manufacturing 1100 provides a metal oxide varistor (MOV) (as part of the protection circuit) with the thermal disconnect device disposed on the MOV such that a portion of the first terminal contacts a surface (e.g., an upper surface or side surface) of the MOV. At block 1112, the method provides a gas discharge tube (GDT) coupled to the MOV, wherein upon occurrence of an overvoltage condition, heat generated by the MOV melts the fuse of the thermal disconnect to form an open circuit by decoupling the first terminal from the second terminal. The method of manufacturing can place the protection circuit into the chamber of the first housing at block 1114. At block 1116, the housing chamber may be filled with a potting material (e.g., epoxy), and then sealed with a cover for securing the protection circuit and the potting material within the housing. The protection circuit and the potting material are enclosed and protected by the first housing. It should be noted that other configurations are foreseeable where block 1104 may be eliminated or altered, if for example, the protection circuit device is used without a protective housing unit (e.g., the first housing) provided in block 1104. Thus, blocks 1114-1116 may be unnecessary. It should be noted that FIGS. 10 and 11 may also be combined to manufacture one of the variety of embodiments, as described herein. For example, the thermal disconnect device of method of manufacturing 1100 may be used to form the thermal disconnect or fuse connection between the spring and the MOV as described in relation to the circuit protection devices 250, 500, and 600.

In view of the forgoing, it will be appreciated that a circuit protection device in accordance with the present disclosure provides an expedient thermal response in the event of overheating due to an abnormal operating condition, and thereby effectively protects devices or circuits that are connected to the circuit protection device from damage that could otherwise result from such abnormal conditions. In addition, it will be appreciated that the circuit protection device in accordance with the present disclosure may be implemented quickly, easily, and at relatively lower cost as compared to conventional circuit protection devices that employ MOVs.

While the present disclosure has been disclosed with reference to certain embodiments, numerous modifications, alterations and changes to the described embodiments are possible without departing from the sphere and scope of the present disclosure, as defined in the appended claims. Accordingly, it is intended that the present disclosure not be limited to the described embodiments, but that it has the full scope defined by the language of the following claims, and equivalents thereof.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A circuit protection device, comprising: a metal oxide varistor (MOV) having a conductive protrusion;
   a spring terminal coupled at a first end to the conductive protrusion to form a thermal disconnect and coupled at a second end to a first input of the circuit protection device;
   a gas discharge tube (GDT) coupled to the MOV, a second input of the circuit protection device and a third input of the circuit protection device, wherein the terminal spring is biased such that upon occurrence of an overvoltage condition, heat generated by the MOV melts the thermal disconnect to decouple the spring terminal from the MOV to form an open circuit; and
   an inductor coupled between the MOV and a first transient voltage suppression (TVS) diode, the first TVS diode being coupled to a second TVS diode, wherein the second TVS diode is coupled to the second input of the circuit protection device, and wherein the MOV is coupled to the second input of the circuit protection device such that the MOV and the first and second TVS diodes are in a parallel configuration.

2. The circuit protection device of claim 1, wherein the first input of the circuit protection device is a load line and the MOV is an MOV stack having more than one MOV.

3. The circuit protection device of claim 2, wherein the second input of the circuit protection device is a neutral line and wherein the MOV stack is coupled to the second input of the circuit protection device.

4. The circuit protection device of claim 1, further comprising an inductor coupled between the MOV and a transient voltage suppression (TVS) diode, wherein the TVS diode is further coupled to the second input of the circuit protection device, and wherein the MOV is coupled to the second input of the circuit protection device.

5. The circuit protection device of claim 1, wherein the MOV is coupled to an additional GDT that is coupled to the second input of the circuit protection device such that the MOV and the additional GDT are in a parallel configuration with the first and second TVS diodes.

6. A circuit protection device, comprising:
   a metal oxide varistor (MOV) stack;
   a first terminal having a first end protruding from at least a surface of the MOV stack;
   a spring terminal having a first end coupled to the first end of the first terminal;
   a housing wherein at least a second end of the first terminal and second end of the spring terminal are secured to the housing; a thermal disconnect coupling the first end of the first terminal to the first end of the spring terminal forming a fuse such that the first terminal is connected to the MOV stack;
   a gas discharge tube (GDT) coupled to the MOV stack, wherein upon occurrence of an overvoltage condition, heat generated by the MOV stack melts the thermal disconnect to form an open circuit by decoupling the first end of the first terminal from the first end of the spring terminal; and
   an inductor coupled between the MOV stack and a first transient voltage suppression (TVS) diode, wherein the first terminal is coupled to a first input of the circuit protection device, the first TVS diode is further coupled to a second input of the circuit protection device, the MOV stack is coupled to the second input of the circuit protection device, and the GDT is coupled between the second input of the circuit protection device and a third input of the circuit protection device.

7. The circuit protection device of claim 6, wherein the first terminal is coupled to a first input of the circuit protection device, the MOV stack is coupled to a second input of the circuit protection device, and the GDT is coupled between the second input of the circuit protection device and a third input of the circuit protection device.

8. The circuit protection device of claim 6, wherein the first TVS diode is coupled to a second TVS diode and wherein the second TVS diode is coupled to the second input of the circuit protection device.

9. The circuit protection device of claim 6 wherein the MOV stack is coupled to a second GDT, which is coupled to the second input of the circuit protection device, the second GDT being coupled between the second input of the circuit protection device and a third input of the circuit protection device.

10. The circuit protection device of claim 6, wherein the first end of the first terminal and the first end of the spring terminal each comprise a planar portion, such that the planar portion of the first terminal and the spring terminal are configured to receive solder to form the fuse.

11. A method of manufacturing a circuit protection device, comprising:
    providing a metal oxide varistor (MOV);
    providing a spring terminal coupled to the MOV and coupled to a first input of the circuit protection device, the spring terminal soldered to the MOV by a low temperature solder fillet forming a fuse having a thermal disconnect;
    providing an inductor coupled to the MOV and the spring terminal;
    providing a first transient voltage suppression (TVS) diode coupled to the inductor and coupled to the MOV, the MOV coupled to a second input of the circuit protection device;
    providing a second TVS diode coupled to the first TVS diode, wherein the second TVS diode is coupled to the second input of the circuit protection device, and the MOV and the first and second TVS diodes are in a parallel configuration; and
    providing a first gas discharge tube (GDT) coupled to the MOV and coupled to a third input of the circuit protection device, wherein upon occurrence of an abnormal operating condition, heat generated by the MOV melts the thermal disconnect to allow the spring terminal to be displaced away from the first terminal of the MOV to define an open circuit
    the first TVS diode being coupled to a second TVS diode, wherein the second TVS diode is coupled to the second input of the circuit protection device, the MOV and the first and second TVS diodes are in a parallel configuration.

12. The method of manufacturing of claim 11, further including providing a second GDT, wherein the second TVS diode is connected to the the first GDT and the second GDT, the second GDT coupled to the MOV and the first GDT.

13. The method of manufacturing of claim 11, further including providing a thermal disconnect disposed between a protrusion of a terminal of the MOV and the spring terminal.

* * * * *